United States Patent
Nakamura et al.

(10) Patent No.: US 8,364,363 B2
(45) Date of Patent: Jan. 29, 2013

(54) POWER TAKE OFF CONTROL SYSTEM

(75) Inventors: Kentaro Nakamura, Wakayama (JP); Akio Hattori, Osaka (JP)

(73) Assignee: Kubota Corporation, Osaka (JP)

( * ) Notice: Subject to any disclaimer, the term of this patent is extended or adjusted under 35 U.S.C. 154(b) by 791 days.

(21) Appl. No.: 12/212,262

(22) Filed: Sep. 17, 2008

(65) Prior Publication Data

US 2009/0216411 A1 Aug. 27, 2009

(30) Foreign Application Priority Data

Feb. 22, 2008 (JP) .................................. 2008-041580
Feb. 22, 2008 (JP) .................................. 2008-041581

(51) Int. Cl.
*G06F 17/00* (2006.01)
(52) U.S. Cl. ............................ 701/68; 701/50; 701/67
(58) Field of Classification Search .................. 701/50, 701/67, 68
See application file for complete search history.

(56) References Cited

U.S. PATENT DOCUMENTS

| | | | |
|---|---|---|---|
| 4,704,922 A * | 11/1987 | Suketomo et al. ............... | 475/64 |
| 6,023,648 A * | 2/2000 | Murasugi et al. ............... | 701/68 |
| 6,253,140 B1 * | 6/2001 | Jain et al. ........................ | 701/67 |
| 6,267,189 B1 * | 7/2001 | Nielsen et al. ............... | 180/53.1 |
| 6,619,451 B2 * | 9/2003 | Hrazdera ...................... | 192/3.58 |
| 7,048,106 B2 * | 5/2006 | Hou ............................. | 192/103 F |
| 7,234,367 B2 * | 6/2007 | Hou et al. ..................... | 74/11 |
| 7,421,917 B2 | 9/2008 | Nishino et al. | |
| 7,832,520 B2 * | 11/2010 | Murakami et al. ............. | 180/338 |
| 2003/0024782 A1 * | 2/2003 | Hrazdera ....................... | 192/3.63 |
| 2006/0150757 A1 | 7/2006 | Nishino et al. | |
| 2010/0242637 A1 * | 9/2010 | Inamori et al. ............... | 74/15.86 |
| 2011/0318156 A1 * | 12/2011 | Saito et al. ..................... | 414/685 |

FOREIGN PATENT DOCUMENTS

| | | |
|---|---|---|
| JP | 5011532 | 5/1975 |
| JP | 56150626 U | 11/1981 |
| JP | 62188824 A | 8/1987 |
| JP | 1175530 A | 12/1989 |
| JP | 2005306107 A | 4/2005 |
| JP | 2006-11843 A | 1/2006 |
| JP | 2006161979 A | 6/2006 |

* cited by examiner

*Primary Examiner* — Joseph C Rodriguez
(74) *Attorney, Agent, or Firm* — The Webb Law Firm

(57) ABSTRACT

A power take-off (PTO) control system for a work vehicle equipped with an implement, comprising a hydraulic multiplate PTO clutch (6) whereby power from the work vehicle is interruptibly transmitted to the implement; a control valve (15) for adjusting an actuating pressure of the PTO clutch; a manually operable clutch operation tool (17, 21) for sending an operation instruction to the control unit; and a control unit (19) for switching the PTO clutch from a disengaged state to an engaged state by controlling the control valve on the basis of the target control characteristics in response to the operation instruction of the clutch operation tool (17, 21). The target control characteristics are generated and set on the basis of the operational behavior of the clutch operation tool (17, 21).

8 Claims, 4 Drawing Sheets

POWER TAKE OFF CONTROL SYSTEM

BACKGROUND OF THE INVENTION

1. Field of the Invention

The present invention relates to a power take off (PTO) control system for a work vehicle equipped with an implement, and particularly to hydraulic control of a PTO clutch.

2. Description of the Related Art

A tractor disclosed in Japanese Laid-open Patent Publication No. 2006-11843, which is one example of a work vehicle, comprises a hydraulic multi-plate PTO clutch that is able to transmit and interrupt power to an implement coupled to a machine body (see C3 of FIGS. 3 and 4 of the abovementioned document), a control valve for supplying hydraulic fluid to the PTO clutch (V4 of FIG. 7 of Patent Document 1), and a PTO clutch lever (43 of FIG. 7 of the abovementioned document). A driver operates the control valve in the tractor by operating the PTO clutch lever. When hydraulic fluid is supplied to the PTO clutch, the PTO clutch enters an engaged state, and when hydraulic fluid is discharged from the PTO clutch, the PTO clutch enters a disengaged state.

Coupling a variety of small- to large-size implements to the machine body allows the tractor to perform a variety of tasks.

The weight of a driven part and the starting torque of a small-sized implement are comparatively low, and therefore even when the PTO clutch is moved to the engaged state and power is transmitted to the small-sized implement, the shock when a drive is initially provided to the small-sized implement is a comparatively small amount. In contrast, the weight of the driven part and the starting torque of a large-sized implement (for example, a large grass mower) are comparatively large, and therefore when the PTO clutch is moved to the engaged state and power is transmitted to the large-sized implement, the shock when a drive is initially provided to the large-sized implement is a comparatively great amount.

SUMMARY OF THE INVENTION

An object of the present invention is to provide a PTO control system which can cause a PTO clutch to be suitably operated in accordance with a variety of implements in cases where any of a variety of implements is coupled to the machine body, and work is performed.

In order to achieve the aforesaid object, the PTO control system according to the present invention, which is intended for a work vehicle equipped with an implement, comprises a hydraulic multi-plate PTO clutch whereby power from the work vehicle is interruptibly transmitted to the implement; a control valve for adjusting an actuating pressure of the PTO clutch; a manually operable clutch operation tool for sending an operation instruction to the control unit; and a control unit for switching the PTO clutch from a disengaged state to an engaged state by controlling the control valve on the basis of target control characteristics in response to the operation instruction of the clutch operation tool. The control unit has target control characteristics generating means for generating the target control characteristics, and target control characteristics setting means for setting the generated target control characteristics.

According to the PTO control system, the target control characteristics used when the PTO clutch is switched from the disengaged state to the engaged state are generated by the target control characteristics generating means each time in response to the operation instruction of the clutch operation tool. Therefore, the hydraulic pressure of the PTO clutch is controlled according to the appropriate control characteristics based on a variety of implements and, when necessary, on the operational state of the clutch operation tool as well.

According to one preferred embodiment of the present invention, pre-recorded control characteristics are employed and the target control characteristics are generated. This obviates the need to generate the entirety of the target control characteristics when the PTO clutch is shifted from the disengaged state to the engaged state, and enables pre-recorded control characteristics to be partially employed. Furthermore, new appropriate target control characteristics can be generated merely by modifying the pre-recorded control characteristics. The process load of the target control characteristics generating means can be reduced thereby.

According to another preferred embodiment of the present invention, the target control characteristics generating means generates target control characteristics in accordance with the speed at which the clutch operation tool is operated. According to this embodiment, when the clutch operation tool is suddenly moved from the disengaged position to the engaged position, the PTO clutch is suddenly switched from the disengaged state to the engaged state. When the clutch operation tool is moved slowly from the disengaged position to the engaged position, the PTO clutch is slowly switched from the disengaged state to the engaged state. For example, when a small-sized implement is coupled to the machine body, the operator can suddenly move the clutch operation tool from the disengaged position to the engaged position. This causes the PTO clutch to be suddenly switched from the disengaged state to the engaged state, power to be quickly transmitted, and the small-sized implement to be driven without delay. When a large-sized implement is coupled to the machine body, the operator can move the clutch operation tool slowly from the disengaged position to the engaged position. This causes the PTO clutch to slowly switch from the disengaged state to the engaged state, power to be slowly transmitted, and shock to be minimized.

More specifically, according to a preferred embodiment, there is provided a sensor for detecting the operational behavior of the clutch operation tool, and when the clutch operation tool is operated at a speed that is greater than a previously set control reference speed, the target control characteristics generating means uses pre-recorded control characteristics for the target control characteristics. This makes it possible to avoid the problem of the PTO clutch being switched from the disengaged state to the engaged state unusually quickly, and shock increasing when the implement is driven. The problem can be avoided even when the operator mistakenly moves the clutch operation tool from the disengaged position to the engaged position unusually quickly.

Other characteristics and advantages of the present invention will become more apparent from the following description of the embodiments taken with the accompanying drawings.

DESCRIPTION OF THE PREFERRED EMBODIMENTS

Figure 1:
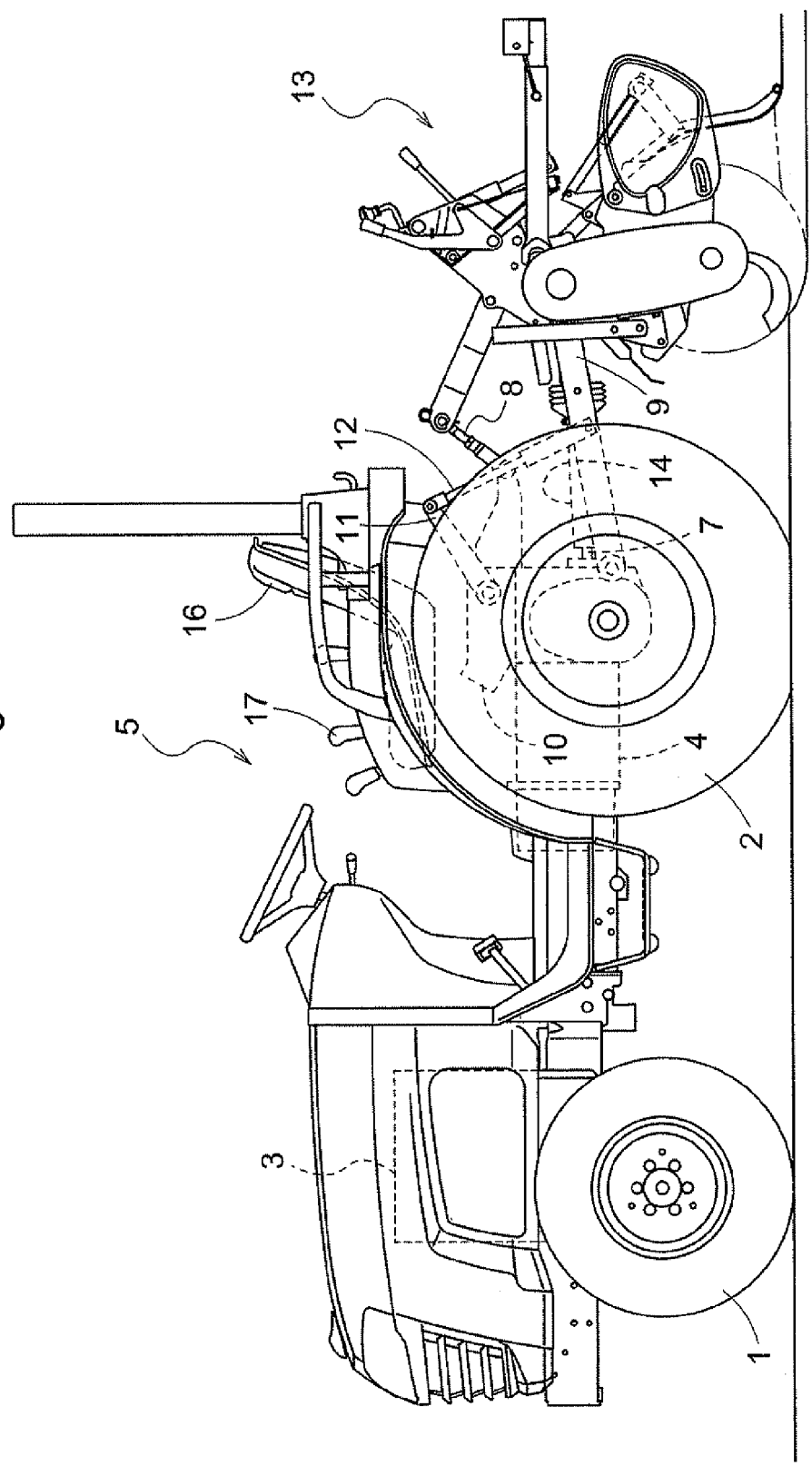
FIG. 1 is a side view of an entire tractor equipped with a PTO control system according to the present invention.

A tractor, which is one example of a work vehicle, is shown in FIG. 1. The tractor has right and left front wheels 1 that can be steered to the right and left, right and left rear wheels 2, an engine 3, a transmission casing 4, and an operator part 5. As can be understood from FIGS. 1 and 2, the power generated by the engine 3 is transmitted to the front wheels 1 and the rear wheels 2 via a hydrostatic continuously variable speed change device (not shown) and a gearshift-type secondary speed change device (not shown) provided to the transmission casing 4. The power generated by the engine 3 can also be transmitted to a PTO shaft 7 provided to a rear part of the transmission casing 4, via a PTO speed change device (not shown) and a PTO clutch 6 provided to the transmission casing 4.

As shown in FIG. 1, a top link 8 and right and left lower links 9 are supported on the rear part of the transmission casing 4 so as to be capable of moving upward and downward, a lift arm 11 that is pivotably driven by a hydraulic cylinder 10 is provided, and a connecting rod 12 spanningly connects the lift arm 11 to the right and left lower links 9. The top link 8 and the right and left lower links 9 are driven up and down by the hydraulic cylinder 10 and the lift arm 11. A variety of implements can be coupled to the top link 8 and the right and left lower links 9.

In FIG. 1, a rotary cultivator device 13 (an implement) is coupled to the tractor at the top link 8 and the right and left lower links 9, and a transmission shaft 14 spanningly connects the PTO shaft 7 and the rotary cultivator device 13. The power generated by the engine 3 is thereby able to be transmitted to the rotary cultivator device 13 via the PTO speed change device, the PTO clutch 6, the PTO shaft 7, and the transmission shaft 14.

Figure 2:
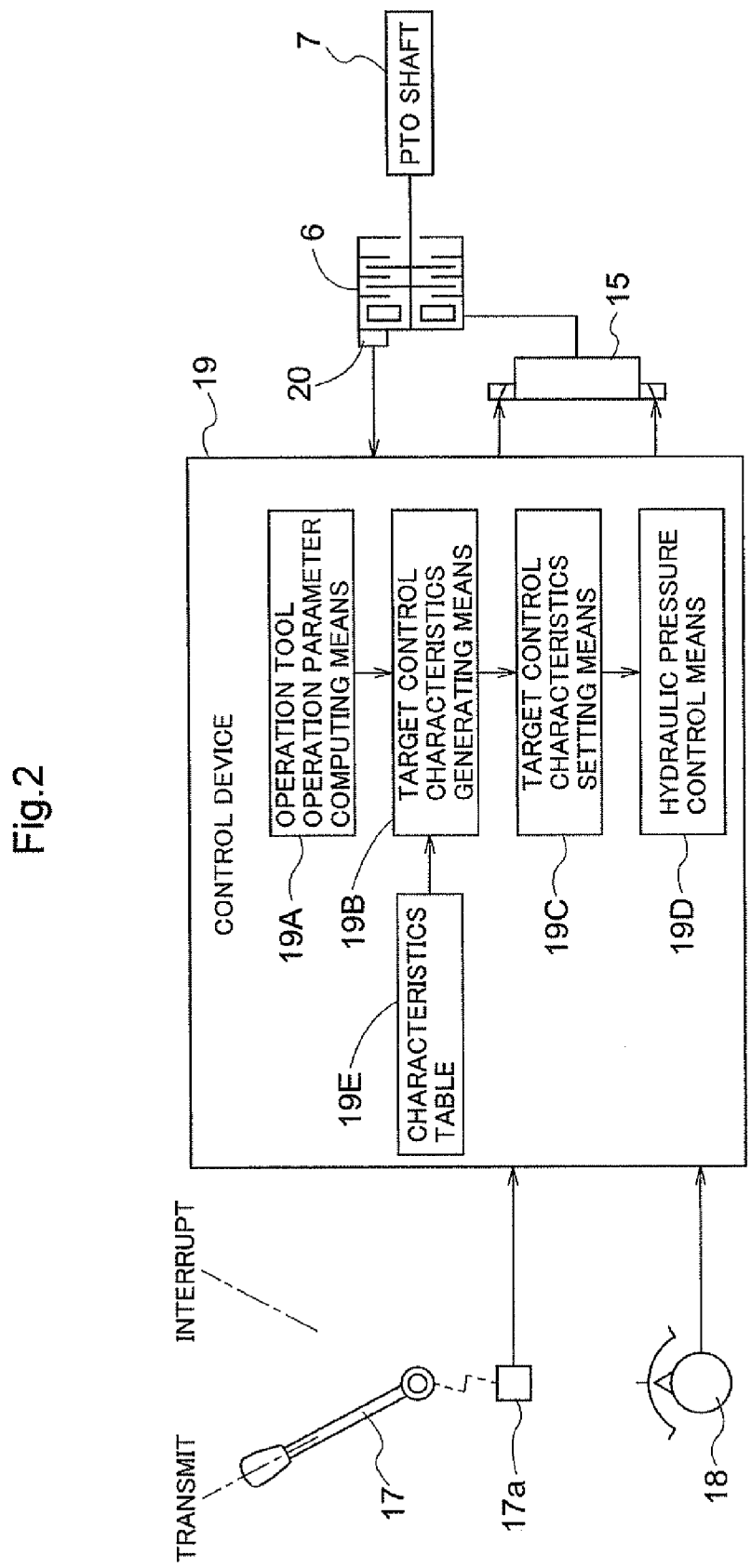
FIG. 2 is a schematic diagram showing the construction of the PTO control system.

As shown in FIG. 2, the PTO clutch 6 is a hydraulic multi-plate clutch. The clutch is changed to the engaged state as a result of hydraulic fluid being supplied, is biased to the disengaged state by a spring (not shown), and is changed to the disengaged state as a result of the hydraulic fluid being discharged. There is provided an electromagnetic proportional control valve 15 via which hydraulic fluid is supplied to and drained from the PTO clutch 6, and the hydraulic pressure behavior (control characteristics) of the control valve 15 is controlled by a control unit 19. As shown in FIGS. 1 and 2, a PTO lever 17 (a clutch operating tool) and a setting switch 18 are provided to the right side of an operation seat 16 of the operation part 5.

As shown in FIG. 2, the PTO lever 17 is constructed so as to be capable of being manually moved between the engaged position and the disengaged position, and the operation position of the PTO lever 17 is input to the control unit 19. A pressure sensor 20 for detecting the actuating pressure P of the PTO clutch 6 is provided, and a value detected by the pressure sensor 20 is inputted to the control unit 19. A lever sensor 17a for detecting operational displacement of the PTO lever 17 is provided in order for the operational parameters of the PTO lever 17, e.g., the operating speed, to be calculated by the control unit 19. A signal outputted by the lever sensor 17a is input to the control unit 19. The setting switch 18 is of a dial type, and can be operated manually. The operation position of the setting switch 18 is inputted to the control unit 19. Operating the setting switch 18 causes a control reference speed V1 described hereafter to be selected from between a high speed and a low speed.

Operation tool operation parameter computing means 19A, target control characteristics generating means 19B, target control characteristics setting means 19C, hydraulic pressure control means 19D, and a control characteristics table 19E for storing predetermined reference control characteristics are provided to the control unit 19 as functional parts specifically relating to the present invention. These functional parts are substantially realized using a computer program and a process data group associated therewith. The operation tool operation parameter computing means 19A calculates the operation parameters of the PTO lever 17; i.e., the operating position, operating speed, rate of change in operating speed, and the like, on the basis of the signal output from the lever sensor 17a. The target control characteristics generating means 19B generates target control characteristics to be used as a target when the PTO clutch 6 is to be switched from the disengaged state to the engaged state, on the basis of the operating parameters of the PTO lever 17 as calculated by the operation tool operation parameter computing means 19A. The target control characteristics setting means 19C sends the target control characteristics generated by the target control characteristics generating means 19B to the hydraulic pressure control means 19D, and sets the characteristics as a control target. The hydraulic pressure control means 19D controls the control valve 15 while evaluating the signal from the pressure sensor 20, so as to switch the PTO clutch 6 from the disengaged state to the engaged state in accordance with the target control characteristics that have been set. The reference control characteristics stored in the control characteristics table 19E are retrieved as needed by the target control characteristics setting means 19C, and are employed when the target control characteristics are to be generated.

The target control characteristics generating means 19B generates target control characteristics to be used as a target when the PTO clutch 6 is to be switched from the disengaged state to the engaged state, on the basis of the operating parameters that constitute the operational behavior of the PTO lever 17 as calculated by the operation tool operation parameter computing means 19A. Accordingly, the operational behavior of the PTO lever 17 and the behavior of the PTO clutch 6 when moving from the disengaged state to the engaged state are harmonized. As a result, PTO clutch control that provides exceptional maneuverability is attained.

Figure 3:
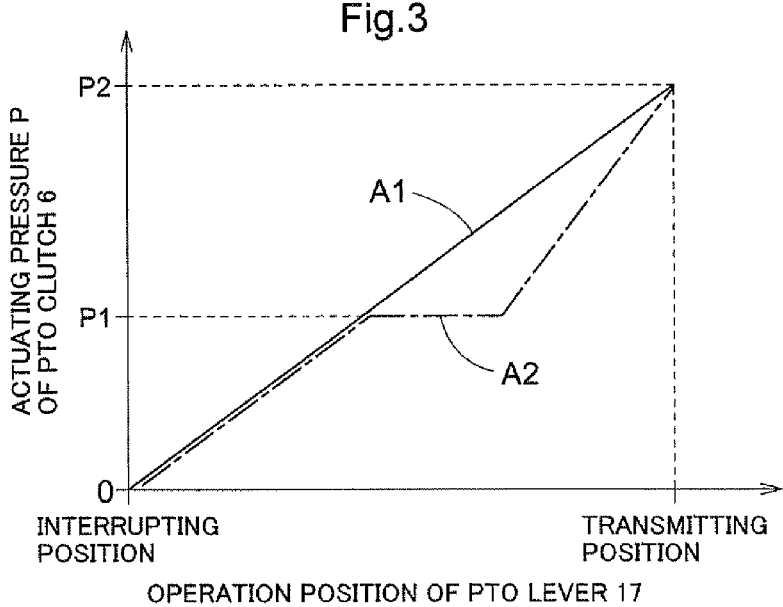
FIG. 3 is a diagram showing the relationship between the operation position of the PTO lever and the actuating pressure of the PTO clutch.
Figure 4:
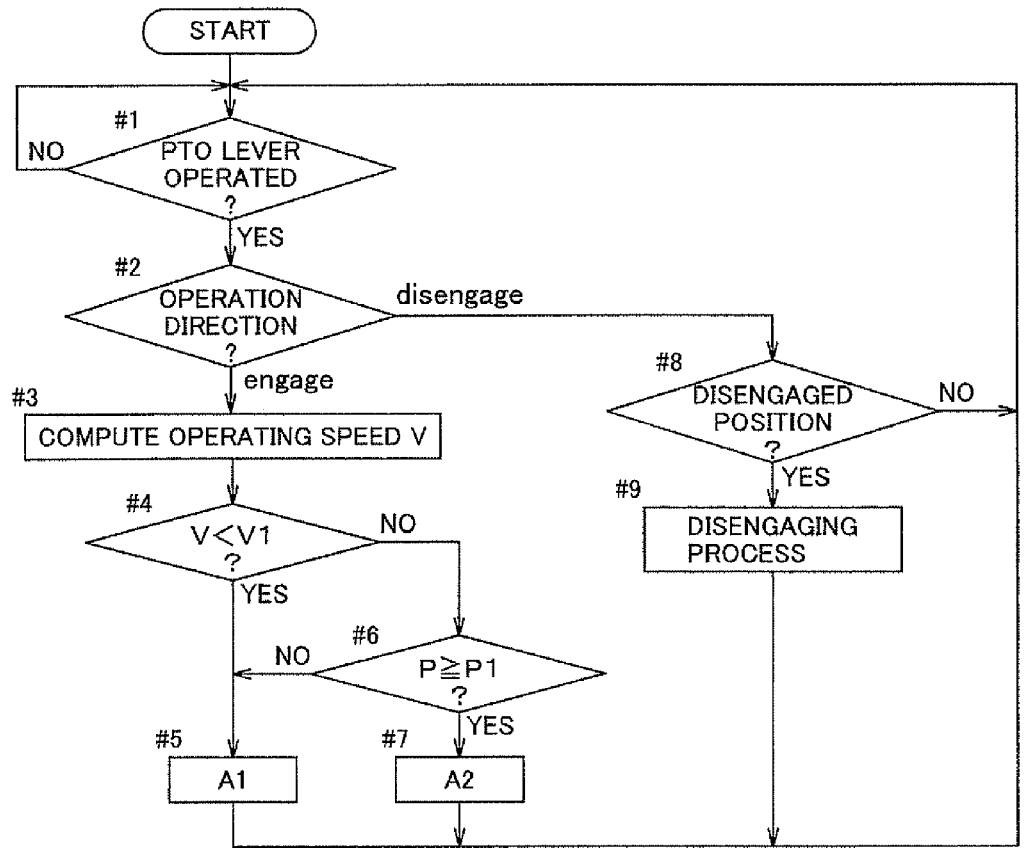
FIG. 4 is a flowchart showing one example of hydraulic pressure control through the PTO control system.

A specific example of the control occurring in the above-described PTO control system is described below using FIGS. 3 and 4. FIG. 3 is a graph showing the relationship between the operating position of the PTO lever and the actuating pressure of the PTO clutch, and expresses one example of the control characteristics used as a target. FIG. 4 is a flowchart of the hydraulic pressure control of the first embodiment.

In this specific example, in a case in which the PTO lever 17 is moved from the disengaged position to the engaged position, the control changes according to whether the operating speed V, when the PTO lever 17 moves from the disengaged position to the engaged position, is faster or slower than the control reference speed V1.

First, a check is performed to confirm whether or not the PTO lever 17 has been operated (#01). If the PTO lever 17 has been operated ("Yes" branch of #01), a check is performed to confirm the direction in which the PTO lever 17 was moved; i.e., whether the direction is from the disengaged position to the engaged position, or from the engaged position to the disengaged position (#02). When operation of the PTO lever 17 from the disengaged position to the engaged position is detected in step #02, the operating speed V of the PTO lever 17 is computed (#03). The operating speed V of the PTO lever 17 and the control reference speed V1 set by the setting switch 18 are compared (#04). If the operating speed V is less than the control reference speed V1 ("yes" branch of #04), the control valve 15 is controlled (#05) so that the relationship between the operational position of the PTO lever 17 and the actuating pressure P of the PTO clutch 6 becomes the relationship shown by the solid line marked by the symbol A1 in FIG. 3. In the control process A1 of step #05, when the PTO lever 17 is moved quickly, the actuating pressure P of the PTO clutch 6 accordingly is controlled to increase at a comparatively high speed, as long as the operating speed V of the PTO lever 17 is lower than the control reference speed V1. Alternatively, if the PTO lever 17 is moved slowly, the actuating pressure P of the PTO clutch 6 accordingly is controlled to increase at a comparatively low speed. When the PTO lever 17 is stopped and held at a desired operating position, the control for increasing the actuating pressure P of the PTO clutch 6 is temporarily suspended, and the actuating pressure P of the PTO clutch 6 is maintained along with the actuating pressure corresponding to the operational position of the PTO lever 17.

In step #04, if the operating speed V is not less than the control reference speed V1 ("no" branch of #04), the actuating pressure P of the PTO clutch 6 and a half clutch actuating pressure P1 (previously set) are compared (#06). In a case in which the actuating pressure P of the PTO clutch 6 is less than the half clutch actuating pressure P1 ("no" branch of #06), the process returns to step #05, and the control valve 15 is controlled in a manner based upon the solid line indicated by the symbol A1 in FIG. 3. In a case in which the actuating pressure P of the PTO clutch 6 is equal to or greater than the half clutch actuating pressure P1 ("yes" branch of #06), the control valve 15 is controlled so that the relationship between the operational position of the PTO lever 17 and the actuating pressure P of the PTO clutch 6 becomes the relationship shown by the dotted line indicated by the symbol A2 in FIG. 3 (#07). In the control process A2 of step #07, the actuating pressure P of the PTO clutch 6 corresponding to the operational position of the PTO lever 17 is lower in comparison with the control process A1 of step #05 during an in crease in pressure from the half clutch actuating pressure P1 to an engaged actuating pressure P2. Therefore, the process of increasing the pressure from the half clutch actuating pressure P1 tends to be slow. Although this is not shown in the flowchart of FIG. 4, once the control process A2 commences, the inconvenience that occurs when the PTO lever 17 is operated at abnormally high speed can be eliminated by having the control process A2 continue up to the point that the PTO lever 17 reaches the engaged position, without the control process A1 being performed.

When operation of the PTO lever 17 from the engaged position to the disengaged position is detected in step #02, a check is performed to confirm whether the PTO lever 17 has been moved to the disengaged position or to an area regarded as the disengaged position (#08). When the PTO lever 17 has been moved to the disengaged position or to the area regarded as the disengaged position ("yes" branch of #08), the actuating pressure P of the PTO clutch 6 is reduced according to the previously set high speed control characteristics, and a disengaging process for switching the PTO clutch 6 to the disengaged state is performed, regardless of the operating speed (#09).

The control reference speed V1 can be switched between high speed and low speed by operating the setting switch 18. When the control reference speed V1 is switched to high speed, then as long as the PTO lever 17 is not moved at a fairly high speed from the disengaged position to the engaged position, the process will not diverge to step #06 after the check performed in step #04. It is therefore possible to control the actuating pressure P of the PTO clutch 6 harmonized with the speed at which the PTO lever 17 is operated. This control is suitable when comparatively small-sized implements are attached.

When the control reference speed V1 is switched to low speed, then should the PTO lever 17 be operated even slightly quickly, the process will diverge to step #06. Accordingly, it is possible to impart a delayed sensation to the control of the actuating pressure P of the PTO clutch 6 achieved by operating the PTO lever 17. This control is suitable when comparatively large-sized implements are attached.

Figure 5:
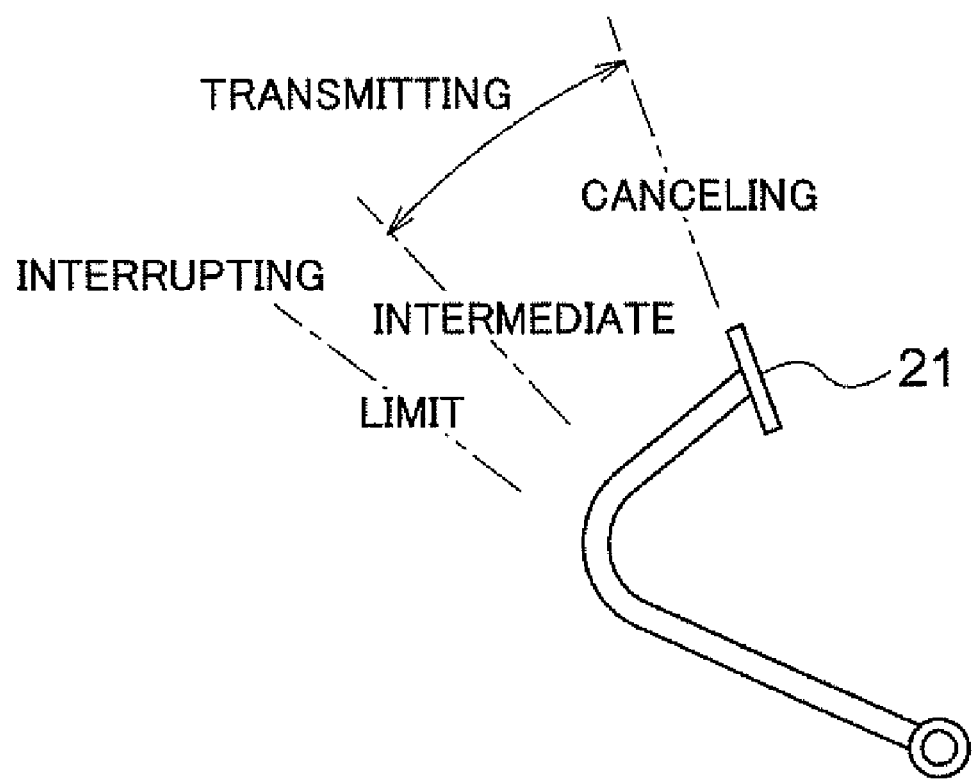
FIG. 5 is a schematic diagram of the right and left side brake pedals used as a clutch operating tool.

In the above embodiment, the PTO lever 17 is employed as a clutch operation tool; however, as shown in FIG. 5, right and left side brake pedals 21 can be employed as the clutch operation tool in place of the PTO lever 17. In a tractor of such description, as shown in FIG. 5, a right side brake (not shown) capable of braking the right rear wheel 2, and a left side brake (not shown) capable of braking the left rear wheel 2 are provided; right and left side brake pedals 21 are provided to the lower right side of the front part of the operation part 5, the right side brake pedal 21 and the right side brake are mechanically connected via a connecting mechanism; and the left side brake pedal 21 and the left side brake are mechanically connected via a connecting mechanism. As shown in FIG. 5, the left and right side brake pedals 21 are capable of being depressed to a canceling position and a limit position, and are biased to the canceling position. The depressed position of the right and left side brake pedals 21 is detected and inputted to the control unit 19. When the right and left side brake pedals 21 are in the canceling position, the right and left side brake are moved to the cancelled state; and when the right and left side brake pedals 21 are depressed from the canceling position, the right and left side brakes are moved to the braking side after a slight amount of play is experienced (in a state wherein the right and left side brakes are in the cancelled state), and an adequate amount of braking power applied by the right and left side brakes (braking power adequate for stopping the machine) is obtained at an intermediate position. As a result, the braking power of the right and left side brakes is maximized at the limit position. The range between the canceling position and the intermediate position of the right and left side brake pedals 21 is set as the engaged position, and the limit position is set as the disengaged position. When the right and left side brake pedals 21 are depressed to the canceling position and the intermediate position (engaged position), the PTO clutch 6 is in the engaged state. When the right and left side brake pedals 21 start to descend from the intermediate position (engaged position) to the limit position (disengaged position), the PTO clutch 6 is promptly switched from the engaged state to the disengaged state, regardless of the speed at which the right and left side brake pedals 21 are depressed from the intermediate position (engaged position) to the limit position (disengaged position). In a state in which the right and left side brake pedals 21 are depressed to the limit position (disengaged position; when the PTO clutch 6 is in the disengaged state), when the right and left side brake pedals 21 begin to return to the intermediate position (engaged position) from the limit position (disengaged position), the speed at which the right and left side brake pedals 21 return from the limit position (disengaged position) to the intermediate position (engaged position) is detected. A hydraulic pressure control is performed as shown in the flowchart of FIG. 5 on the basis of the speed at which the right and left side brake pedals 21 return from the limit position (disengaged state) to the intermediate position (engaged state), and the PTO clutch 6 is switched to the engaged state.

The hydraulic pressure control depicted in the flowchart of FIG. 4 is also performed in a state in which the right and left side brake pedals 21 are both depressed at the same time (machine stopping operation), and in a state in which the right and left side brake pedals 21 both return at the same time (machine starting operation or the like). However, a hydraulic pressure control of such description is not performed in a state in which only one of the right and left side brake pedals 21 is depressed (when the machine is making a turn or the like) or only one of the right and left side brake pedals 21 has subsequently returned.

Plot A1 (solid line) in the graph shown in FIG. 3 need not be in the form of a linear function (straight line), but may be in the form of a quadratic function (curving line) arching upward or downward. Similarly, the plot A2 (dashed line) may be set in the form of a quadratic function (curving line) arching upward or downward.

In the above specific example, the target control characteristics generating means 19B generates the target control characteristics in response to the operation parameters of the clutch lever 17 as computed by the operation tool operation parameter computing means 19A. However, alternatively, the target control characteristics may be generated by compiling the reference control characteristics stored in the characteristics table 19E. For example, the slope and shape of the reference control characteristics may be changed according to the operation parameters of the clutch lever 17, and used as the target control characteristics; and the slope and shape of the reference control characteristics may be changed according to the value set by the setting switch 18, and used as the target control characteristics. Finally, the slope and shape of the reference control characteristics may be changed according to the operation parameters of the clutch lever 17 and the value set by the setting switch 18, and used as the target control characteristics. When a plurality of reference control characteristics is stored in the characteristics table 19E, an advantageous increase is obtained in terms of the variability of the control characteristics.

What is claimed is:

1. A power take-off (PTO) control system for a work vehicle equipped with an implement, comprising:
   a hydraulic multi-plate PTO clutch whereby power from the work vehicle is interruptibly transmitted to the implement;
   a control valve for adjusting an actuating pressure of the PTO clutch;
   a manually operable clutch operation tool for sending an operation instruction to a control unit; and
   the control unit operatively coupled to the control valve and the manually operable clutch comprising an operation tool operation parameter computing module computing an operation parameter of the clutch operating tool based on a detection signal from a sensor for detecting operational behavior of the clutch operation tool, a target control characteristics generating module, and a target control characteristics setting module,
   wherein the control unit switches the PTO clutch from a disengaged state to an engaged state by controlling the control valve on the basis of target control characteristics generated by the target control characteristic generating module based on the operation parameter and set by the target control characteristics setting module in response to the operation instruction of the clutch operation tool, and
   wherein the operation parameter comprises one of an operating speed of the clutch operating tool and a rate of change in an operating speed.

2. The PTO control system for a work vehicle according to claim 1, wherein: the target control characteristics generating module generates the target control characteristics in which pre-recorded control characteristics are employed.

3. The PTO control system for a work vehicle according to claim 1, wherein: the target control characteristics generating module generates the target control characteristics in accordance with the speed at which the clutch operation tool is operated.

4. The PTO control system for a work vehicle according to claim 3, wherein: a sensor for detecting operational behavior of the clutch operation tool is provided, and when the clutch operation tool is operated at a speed that is greater than a previously set control reference speed, the target control characteristics generating module uses pre-recorded control characteristics as target control characteristics.

5. A power take-off (PTO) control system for a work vehicle equipped with an implement, comprising:
   a hydraulic multi-plate PTO clutch whereby power from the work vehicle is interruptibly transmitted to the implement;
   a control valve for adjusting an actuating pressure of the PTO clutch;
   a manually operable clutch operation tool for sending an operation instruction to a control unit; and
   the control unit configured, in response to the operation instruction of the clutch operation tool, to generate target control characteristics which is a target value of a control factor for placing the control valve in a target state and to switch the PTO clutch from a disengaged state to an engaged state by controlling the control valve on the basis of the generated target control characteristics, the control unit including:
      an operation tool operation parameter computing module computing an operation parameter of the clutch operating tool based on a detection signal from a sensor for detecting operational behavior of the clutch operation tool;
      a target control characteristics generating module generating the target control characteristics based on the operation parameter computed by the operation tool operation parameter computing module;
      a target control characteristics setting module setting the target control characteristics generated by the target control characteristics generating module; and
      a hydraulic pressure control module controlling the control valve for switching the PTO clutch from the disengaged state to the engaged state in accordance with the target control characteristics set by the target control characteristics setting module
   wherein the operation parameter comprises one of an operating speed of the clutch operating tool and a rate of change in an operating speed.

6. The PTO control system for a work vehicle according to claim 5, wherein the target control characteristics generating module uses pre-recorded control characteristics to generate the target control characteristics.

7. The PTO control system for a work vehicle according to claim 5,
   wherein the operation parameter comprises the operating speed of the clutch operating tool; and wherein the target control characteristics generating module generates the target control characteristics depending on the operating speed.

8. The PTO control system for a work vehicle according to claim 5, wherein when the clutch operation tool is operated at a speed that is greater than a previously set control reference speed, the target control characteristics generating module uses pre-recorded control characteristics as target control characteristics.

* * * * *

UNITED STATES PATENT AND TRADEMARK OFFICE
CERTIFICATE OF CORRECTION

PATENT NO. : 8,364,363 B2  
APPLICATION NO. : 12/212262  
DATED : January 29, 2013  
INVENTOR(S) : Kentaro Nakamura et al.

Page 1 of 1

It is certified that error appears in the above-identified patent and that said Letters Patent is hereby corrected as shown below:

Column 8, Line 56, Claim 5, after "module" insert -- , --

Signed and Sealed this  
Ninth Day of April, 2013

Teresa Stanek Rea  
*Acting Director of the United States Patent and Trademark Office*